(12) United States Patent
Kaltenmeier et al.

(10) Patent No.: US 7,505,901 B2
(45) Date of Patent: Mar. 17, 2009

(54) INTELLIGENT ACOUSTIC MICROPHONE FRONTED WITH SPEECH RECOGNIZING FEEDBACK

(75) Inventors: Alfred Kaltenmeier, Ulm (DE); Klaus Linhard, Schelklingen (DE)

(73) Assignee: Daimler AG, Stuttgart (DE)

( * ) Notice: Subject to any disclaimer, the term of this patent is extended or adjusted under 35 U.S.C. 154(b) by 897 days.

(21) Appl. No.: 10/927,818

(22) Filed: Aug. 27, 2004

(65) Prior Publication Data

US 2005/0049864 A1 Mar. 3, 2005

(30) Foreign Application Priority Data

Aug. 29, 2003 (DE) ................. 103 39 973

(51) Int. Cl.
*G10L 15/00* (2006.01)

(52) U.S. Cl. .................. 704/231; 704/235; 704/270

(58) Field of Classification Search .............. 704/9, 704/231, 246, 270, 270.1, 275, 225, 226, 704/200, 234, 235, 239, 242

See application file for complete search history.

(56) References Cited

U.S. PATENT DOCUMENTS

| 6,230,138 | B1 | 5/2001 | Everhard |
| 6,748,088 | B1 | 6/2004 | Schaaf |
| 2002/0010581 | A1 | 1/2002 | Euler et al. |
| 2003/0009329 | A1 | 1/2003 | Stahl et al. |

FOREIGN PATENT DOCUMENTS

| CA | 2 367 579 A1 | 9/2000 |
| CA | 2 391 797 A1 | 7/2001 |
| DE | 198 12 697 A1 | 9/1999 |
| DE | 199 10 234 A1 | 9/2000 |
| DE | 199 43 872 A1 | 3/2001 |
| DE | 199 34 724 A1 | 4/2001 |
| DE | 199 58 836 A1 | 5/2001 |

(Continued)

*Primary Examiner*—Huyen X. Vo
(74) *Attorney, Agent, or Firm*—Patent Central LLC; Stephan A. Pendorf

(57) ABSTRACT

Voice command operated systems are being installed in modern motor vehicles with increasing frequency. Such systems should be operable by various vehicle occupants and from various seating positions. A new type of speech recognition system is described, which is good at accomplishing these tasks. Therein, for regulating the speech recognition system, the reception characteristic of a a directionally selective microphone array (12) is controlled by an optimization unit (10). These speech signals are then processed in a speech recognizer (11) at least parallel in time. Then, on the basis of the results provided by the speech recognizer (11), the reception characteristic of the microphone array (12) is so controlled by an optimization unit (10), that the recognition performance of the speech recognizer (11) downstream of the optimization unit (10) is optimized. Herein, the speech recognizer is supplied with the received speech signals from different spatial directions parallel or at least quasi-parallel via the speech channels (14), so that this selects and further processes those speech signals that have the potential for the best possible recognition performance. On the basis of the recognition results, the optimization unit (10) obtains via the speech recognizer the necessary regulatory signals (18), in order to optimize the reception characteristics of the microphone array (12) by means of the optimization unit (10) with regard to the respective direction from which speech signals are received, which have the potential for the best possible recognition performance.

8 Claims, 3 Drawing Sheets

FOREIGN PATENT DOCUMENTS

| | | | | | |
|---|---|---|---|---|---|
| DE | 100 30 105 A1 | 1/2002 | EP | 1 081 682 A2 | 3/2001 |
| DE | 101 33 126 A1 | 1/2003 | EP | 1 085 781 A2 | 3/2001 |
| | | | JP | 2002-091469 | 3/2002 |
| | | | WO | WO 00/54252 A2 | 9/2000 |

INTELLIGENT ACOUSTIC MICROPHONE FRONTED WITH SPEECH RECOGNIZING FEEDBACK

BACKGROUND OF THE INVENTION

1. Field of the Invention

The invention concerns an intelligent acoustic microphone front end and a process for operation thereof according to the precharacterizing portion of Patent claims 1 and 6.

Voice command operated systems are being installed in modern motor vehicles with increasing frequency. Such systems should be operable by various vehicle occupants and from various seating positions. It is also an object, in the framework of modern occupant communication systems, to equip the individual seat places in the passenger compartment with specifically assigned microphones and loudspeakers. Thereby it is to be ensured that the individual occupants can communicate comfortably at any time from any position, independent of the physical design of the occupant communication system.

2. Related Art of the Invention

Japanese document JP 2002-091469 discloses a speech recognition system using a switchable, directionally selective microphone array for beam-forming for recording speech signals. The unit for beam-forming includes a directional recognizer, which uses the recorded speech signals to recognize the azimuth of the direction of speech origin. For this, signals are received from different angular directions with regard to the reception characteristic of the microphone array and subjected to a sound level analysis. In the framework of this threshold analysis the direction recognizer provides the most probable direction from which the speech signal originates as recognition result. This result is then used by the unit for beam forming for controlling the microphone array, so that the reception diagram of the microphone array is oriented with the greatest probability as close as possible towards the direction from which the speech signal originates.

From published EP 1 081 682 A2 a speech recognition system for an occupant communication system is known, which includes a number of differently positioned microphone systems. The signals of the individual microphone systems are detected in parallel and analyzed with regard to the signal-noise ratio parameter and the average speech level contained in the signal. Those signals, of which the parameters exceed predetermined threshold values, are supplied to a speech recognizer, which sequentially processes the individual signals, beginning with the strongest signal. From the positive recognition results, the speech content of the signal is determined. By the parallel analysis of the microphone signals recorded at different locations, a speaker is no longer required to speak the voice commands in a particular direction; it is also possible for the direction of speech to change during the speaking process, without loss of information.

A further speech recognition setup for parallel processing of multiple parallel microphones channels is described in German laid open DE 100 30 105 A1. Here the individual microphone channels are subjected to a character extraction independent from each other, and merged for the first time in the framework of a common classification. On this basis the information supplied to the classification still contains the information associated with the individual channels. It is also possible to individually carry out the preliminary processing in the individual channels, and to independently monitor the therefrom resulting effects on the signals.

SUMMARY OF THE INVENTION

It is the task of the invention to provide a speech recognition system, which on the one hand exhibits an improved speaker acquisition and on the other hand makes possible an optimized control of the speaker acquisition.

This task is solved by a process, and a device suitable for carrying out the process, having the characteristics of Patent claims 1 and 6. Advantageous embodiments and further developments are set forth in the dependent claims.

For regulating the speech recognition system a microphone array (12) is modified in its reception characteristic by an optimizing unit (10), wherein speech signals are received by the microphone array (12). These speech signals are then processed in a speech recognizer (11) at least parallel in time. Then, on the basis of the results provided by the speech recognizer (11), the reception characteristic of the microphone array (12) is so controlled by an optimization unit (10), that the recognition performance of the speech recognizer (11) downstream of the optimization unit (10) is optimized. In inventive manner herein, the speech recognizer is supplied with the received speech signals parallel or at least quasi-parallel via the speech channels (14), so that these different speech signals can be processed at least parallel in time. The recognition results are then compared with each other with respect to their quality, wherein on the basis of this comparison those speech signals that have the potential for the best possible recognition performance are selected and further processed. Further, on the basis of the recognition results, the optimization unit (10) obtains via the speech recognizer the necessary regulatory signals (18), in order to optimize the reception characteristics of the microphone array (12) by means of the optimization unit (10) with regard to the respective speech channels (14), which supply the speech signals, which have the potential for the best possible recognition performance.

In the sense of the present invention a quasi-parallel signal processing or signal transmission is of course to be considered equivalent to a parallel signal processing or signal transmission. In a quasi-parallel signal processing or signaled transmission the processing or transmission occurs partially sequentially (on the basis of the processor dimensioning or lack of capacity of the transmission channels (14)), the processing results are however so treated as though the processing or transmission process actually occurred parallel or, as the case may be, simultaneous.

In particularly advantageous manner the invention makes possible an intelligent optimization of the reception characteristic of the microphone array (12), since the regulating is based on the recognition results of a speech recognizer (11) and not only on the basis of purely abstract, physical signal parameters (strength of the signal level or ratios of the signals at the outputs of the individual microphones of the microphone array).

As the microphone system, particularly useful is a microphone array, that is, an integration of an assembly of multiple individual microphones. For this the individual microphones can be integrated into one or more groups, whereby varying directional selectivity of the reception characteristic of the individual microphone arrays can be achieved. At the output of the microphone assembly (12) then parallel or quasi-parallel speech signals from varying spatial directions can be sampled and supplied to a further processing in a speech recognizer (11).

It is conceivable to modify the reception characteristic of the microphone array (12) in varying manners and to optimize with regard to different reception directions:

on the one hand it is conceivable to actively steer or control the directional selectivity (directional effect) of the reception characteristic of the microphone array (12).

on the other hand the reception characteristic can also be optimized in the respect that multiple of the individual microphones of the microphone array are provided with units for noise suppression downstream.

These two preferred optimization processes and design possibilities can be employed individually or in combination. The speech recognition system is in advantageous manner so designed, that multiple of the individual microphones of the microphone array (12) are associated with devices for noise suppression, and the optimization unit (10), starting from or based on the regulating signals (18) of the speech recognizer (11), controls and modifies both the directional selectivity as well the noise suppression.

It is however at the same time conceivable, that the microphone system (12) as microphone array is so designed, that the reception characteristic thereof includes one or more specific directionality that is permanently predetermined, so that the optimization unit (10) only controls multiple of the units downstream of the individual microphones for noise suppression and therewith modifies the reception characteristic of the microphone array (12). In this manner the complexity of the circuitry and the cost with regard to the microphone array (12) can be minimized. In the same way it is of course also conceivable to dispense with the units for noise suppression downstream of the multiple individual microphones.

Another advantageous embodiment of the microphone system (12), which is particularly suited when for physical or designer technical reasons only a small space is available for installation, is comprised therein, that only one individual microphone is used. Herein the output signal thereof is divided into multiple parallel or quasi-parallel speech channels, which are assigned to specific signal preparation units (in particular units for noise suppression) for these specific speech channels. The optimization unit (10) then, in the framework of speech recognition, exercises influence on the functional parameters of the signal processing unit so that those speech channel-specific signal preparations which provide the best recognition results in the speech recognizer (11) are optimized.

The invention can thus be connected in particularly advantageous manner with the various types of microphone systems or layouts, in order thereby to be influenced in their functionality. Thereby the invention can also be employed in and adapted to the most diverse locations (motor vehicle (little available space), conference room (generous availability of space)) and employment conditions (speaker position with varying speakers or, however, multiple simultaneous speaker positions with strong environmental noise).

BRIEF DESCRIPTION OF THE DRAWINGS

In the following the invention will be described in greater detail on the basis of illustrative embodiments and with the aid of figures. Therein.

DETAILED DESCRIPTION OF THE INVENTION

Figure 1:
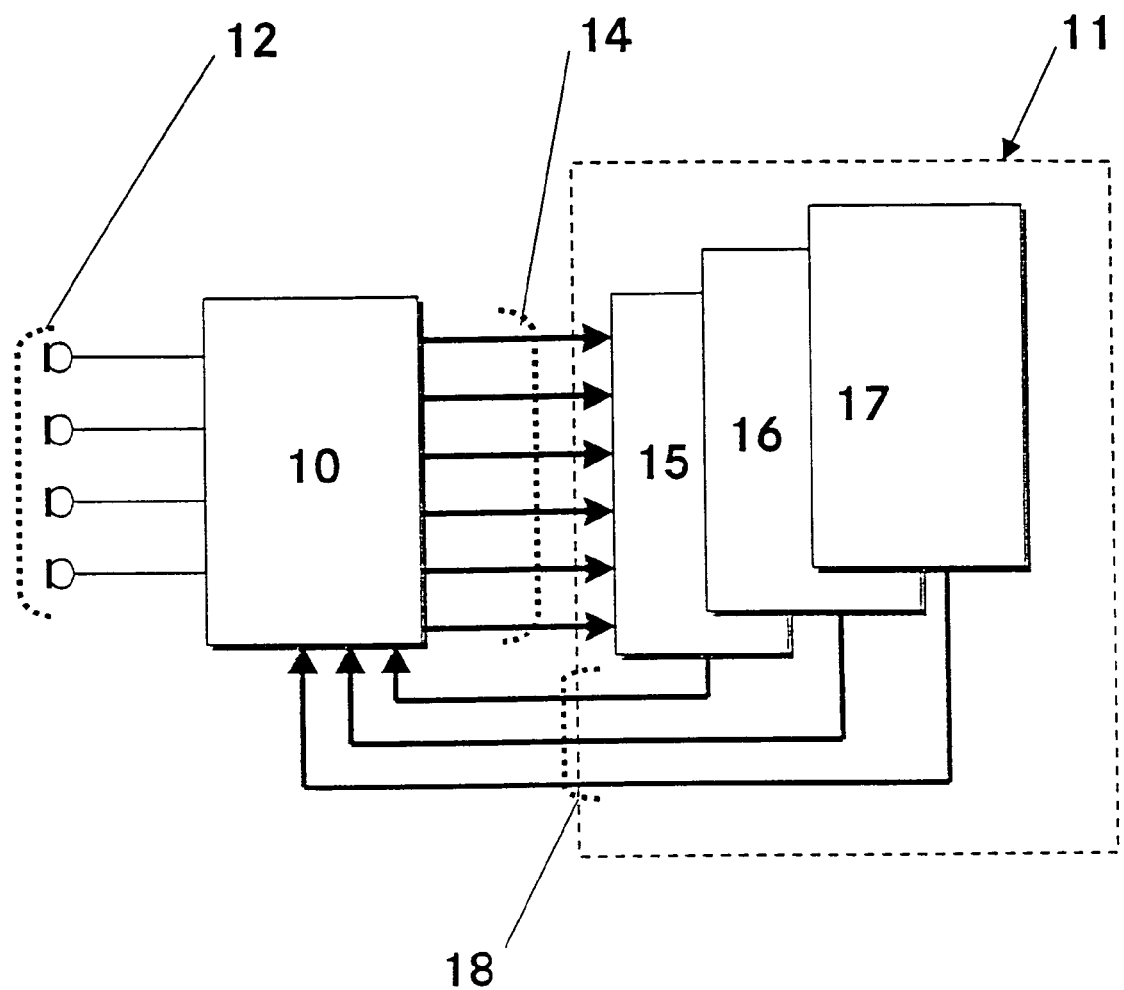
FIG. 1 shows the design of a preferred embodiment of the multi-stage, regenerative or feedback speech recognition system.

With the aid of the figures embodiments are described, in which the directional selectivity (directional effect) of the reception characteristic of the microphone system (12) is influenced in particular by the optimization unit (10). The person of ordinary skill in the art can adapt the illustrative embodiment to other applications, wherein the reception characteristics of the microphone system (12) are modified, additionally or only, by the control of units for noise suppression, which are connected downstream of multiple of the individual microphones. The same applies for the case, in which the microphone system (12) is comprised of only a single microphone, of which the output signal is subdivided into multiple parallel or quasi-parallel channels with channel-specific signal preparation (in particular noise reduction).

In particularly advantageous manner the inventive speech recognition system can be so designed that the speech recognizer (11) is equipped in such a manner that the speech recognition occurs in the framework of a multi-stage process. Thereby there occurs by one or more of these processing steps or stages on the one hand a selection of the speech signals that have the potential for the best possible recognizability, whereupon these are supplied to a further processing. On the other hand these individual processing steps or stages provide individually or collectively to the optimization unit (10) the necessary regulatory signals (18), in order to optimize the reception characteristic of the microphone array (12). In the illustrated example the microphone system (12) is comprised of a directionally selective microphone array, the optimization unit (10) is used in particular to optimize the directional selectivity of the reception characteristic of the microphone system (12) with regard to the respective direction from which the respective speech signal is being received which has the best possible potential for recognizability.

As illustrated in FIG. 1, the speech recognizer is comprised in advantageous manner of at least three sequential processing units, which include at least a classifier (15), for recognition of sound units and/or sound sub-units of sound units, a unit for word recognition (16), for recognizing spoken words, and a unit for recognizing and interpreting meaningful sentences (17).

Herein the individual processing units (15, 16, 17) of the speech recognizer (11) are connected to each other so that multiple of the previously parallel processed signals can be transmitted or relayed parallel or quasi-parallel to the subsequent processing steps. Thus, not only is the speech signal identified as "best" signal further processed, but rather it is possible to further take into consideration also additional "good" speech signals. One design or embodiment of this type is in particular advantageous for the reason that it has been found sometimes in reality, that certain signals may provide excellent results in one of the processing steps, but however cannot be used in subsequent processing steps; here then it is often the case that those speech signals which were cut out in the preceding processing step because they do not have such a good result, do provide overall a better result. If for example the spoken word "he" is changed due to interfering environmental noises into a perceived "the", then this mistake is frequently corrected by the unit for speech interpretation (17) into "he", if the word recognizer supplies in parallel both the words "he" as well as "the". If the word recognizer relays however only that word, which it recognizes with the highest degree of probability, then the unit for speech interpretation (17) would have no possibility to recognize that in this context the word "he" is correct.

Multiple microphone signals are supplied via input leads (15) parallel or quasi-parallel, through the optimization unit (10), to the speech recognizer (11). These could be signals of the most diverse type. In the simplest case, the parallel transmitted signals correspond to the individual signals of the individual single microphones forming the microphone system (12). It is however also conceivable to relay preprocessed microphone signals already preprocessed through the optimization unit (10) over the individual parallel transmitted signal channels. Thereby it is possible that the signal channels relay signals from different spatial directions (21), which are generated by adaptive beam forming and integration of the signals of multiple individual microphones (12). It could however very well also be the speech signal from a single spatial direction ($21_{(1-k)}$) received with differently constituted reception characteristics of the microphone array (for example: breadth/narrowness of reception lobe, diverse reception parameters and sensitivities or diverse methods or, as the case may be, parameters of noise reduction). By means of the back-coupling or regeneration of the control signal from speech recognizer to optimization unit (10), the reception characteristic of the microphone array can also be controlled with regard to the number and type of characteristics and on the basis of diverse optimized noise reduction parameters.

The optimizing unit (10) obtains its control signal, via one or more control lines (18), from speech recognizer (11) or, as the case may be, from one of its subcomponents (15, 16, 17). The classifier (15) can for example bring about suppression of reception of those spatial directions that supply only acoustic signals that are not speech signals. By the control signal of the unit for word recognition (16) the reception characteristic can be further optimized, in order to generate a suitable received signal, from which words can be optimally extracted. With regard to the previously discussed example in which, due to interfering signals, the word "he" is, at least in the case of certain reception characteristics, received by the microphone array as the word "the", by the targeted control by the unit for speech interpretation the reception characteristic of the microphone array can be optimized in the manner that the, in this case, interferences leading to false results are optimally suppressed.

This particularly advantageous concept of the multistage, parallel control of the reception characteristic of the microphone system (12) makes possible a best-possible elimination of interferences and results in an optimal speech recognition.

Figure 2:
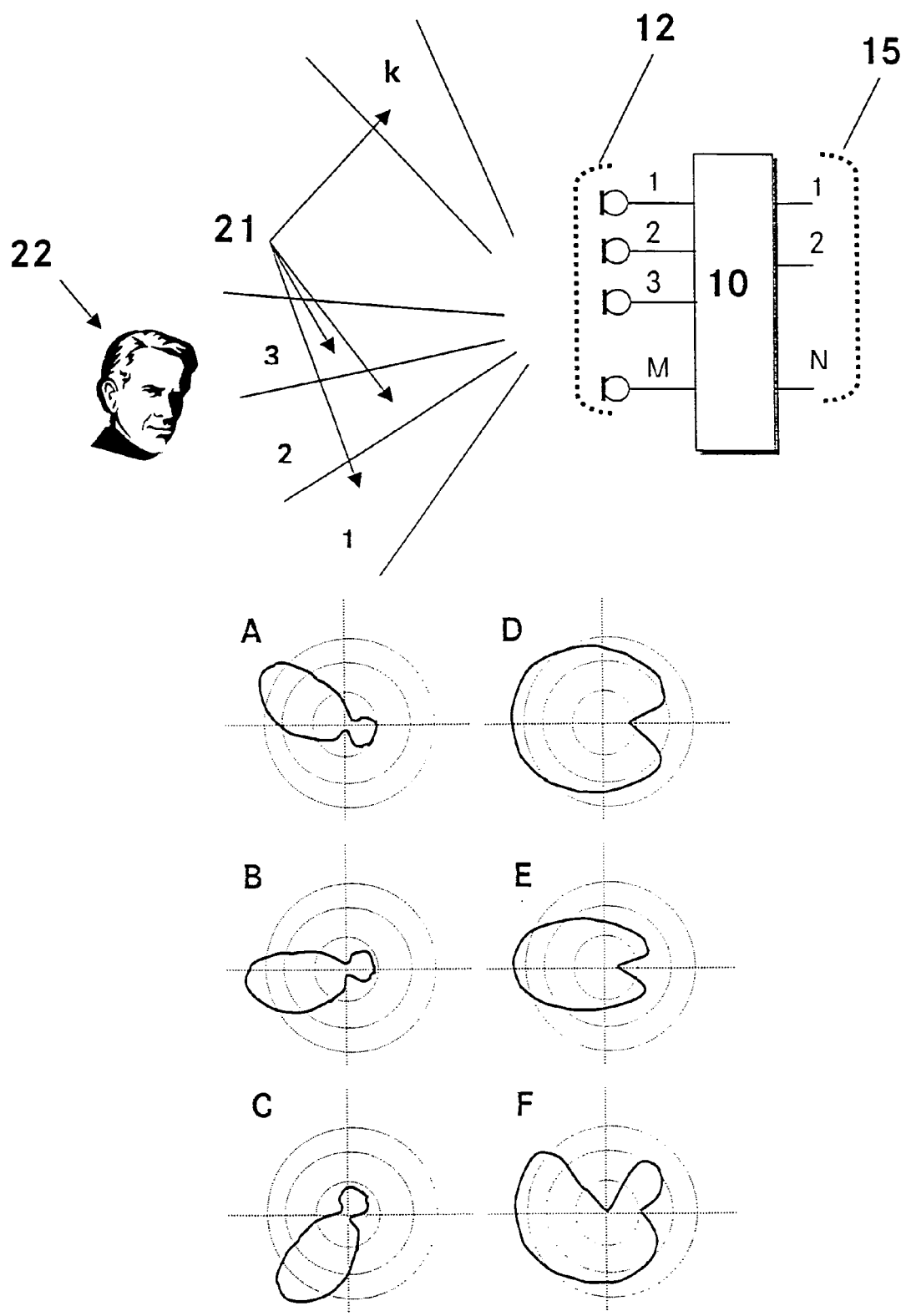
FIG. 2 shows the variability of the reception characteristics of the microphone array steered or controlled by the unit for beam forming.

FIG. 2 shows the variability of the reception characteristics of the microphone array of M individual microphones (12) controlled by the optimizing unit (10). Herein the optimization unit (10) has N parallel outputs (15) for transmitting the microphone signals to the speech recognizer (11). As already discussed above, the number N of the outputs (15) of the optimization unit (10) need not correspond with the number N of the individual microphones (12) at its input, since the parallel output signals do not represent in general mere copies of the starting signals of the individual microphones of the microphone array, but rather generally a complex fusions of these signals. In the lower half of FIG. 2, as an example, six possible receive characteristics of the microphone array are shown. Thus it is conceivable for example to form reception characteristics that are selective with regard to different spatial directions (A, B, C) or which exhibit different directional selectivity (D, E) or which have a zero-setting or position (F) (for example in the direction of a dominant noise source, such as an open window).

In the example shown in FIG. 2 a speaker (22) is located for example approximately between the virtual room sectors 2 and 3, so that the best recognition line can be expected using the receive characteristics indicated with B, D, E and F in the lower part of FIG. 2 formed by optimization unit (10). From this FIG. 2 it is however at the same time clear, that in the front end of an actual speech recognition it is difficult to select one of these four received characteristics B, D, E and F, so that it is certainly better to process in parallel in the speech recognizer (11) all of the signals resulting from the four reception characteristics, and only later to undertake a selection or an optimization of the reception characteristics.

The adaptation of the reception characteristic (beam forming) of the microphone system (12) can occur by means of known processes, for example, by means of the method according to Griffith-Jim or the Frost-Beam forming method.

Besides this, it is often conventional to provide, downstream of a unit for adaptation of the reception characteristic of a microphone (microphone-beam former), a one channel noise suppression process, such as for example the known process of spectral subtraction (in the spectral region of the microphone signal a noise-estimation value is subtracted). Simple noise reduction processes use for example only spectral subtraction. In the present case the one channel process can be used for the post-processing of the individual outputs of the unit for adaptation of the reception characteristic. The spectral subtraction brings along with it, for its part, parameters, such as for example a factor as to how the noise-estimation value is to be weighted prior to subtraction, or a lower threshold in the spectrum which may not be exceeded following subtraction (the so-called spectral floor). The noise weighting factor and the lower threshold of the spectrum are parameters. From each of the outputs of the microphone beam former there can now again be produced multiple outputs, when the output signal of the beam former runs through multiple parameter-variants of a spectral subtraction.

Figure 3:
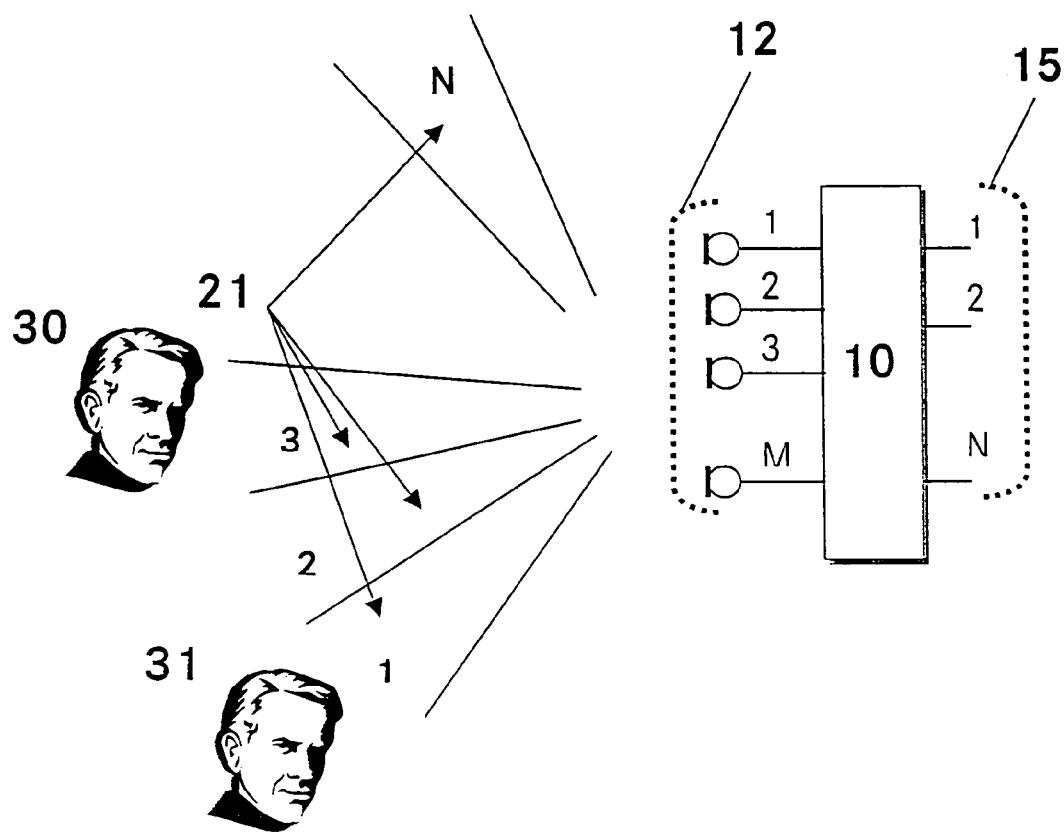
FIG. 3 shows an example of the possible statistical evaluations of the signals of the microphone array for recognizing and localizing multiple speakers.
Figure 3:
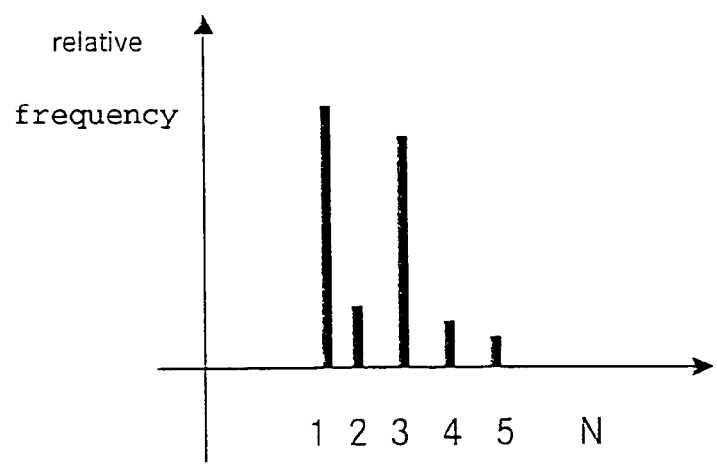

In particularly advantageous manner, the inventive speech recognition system can be modified to the extent that it is capable of recognizing received signals of multiple speakers (30, 31) in the microphone system (12). If multiple speakers (30, 31) are recognized, then by the optimization unit (10) different selectable reception characteristics can be optimized for the speech direction of the different speakers. FIG. 3 illustrates a particularly advantageous process for recognizing multiple speakers (30, 31) in the signal received by the microphone system (12). Therein, over a predetermined period of time, a statistic is carried out regarding how often each individual of the N-outputs of the optimization unit (10) the respective of the N speech signal channels (15) is identified by the speech recognizer (11) which supplies the "best" signal. From the recognition of the reception characteristics of the optimization unit (10) associated with the individual speech recognition channels (15) the number of the speakers (30, 31) can then be estimated. In the example illustrated in FIG. 3 one of the speakers (30) is in spatial sector (3) and one speaker (31) is in spatial sector (1). The system uses, from N speech signal channels (15), that respective one of N adjacent lying space sectors (21) associated with specified reception characteristics. If then over a predetermined period of time, during which the speakers (30) and (31) are speaking, a statistic is carried out regarding the quality of the speech signals in the individual channels, then there results the statistic approximately as shown in FIG. 3. In particularly advantageous manner the here shown statistical evaluation is produced on the basis of a histogram, wherein other statistical evaluation processes likewise can also be employed. In a statistical evaluation on the basis of a histogram there are listed, with regard to the example shown in FIG. 3, various spatial adjacent lying reception characteristics (spatial directions) along the ordinate of the diagram. Therein it is shown how frequently a received signal from one these particular spatial directions (21) contributes to a useable recognizable result. In this manner a conclusion can be made regarding different speakers (30, 31) if, when between two spatial directions clearly predominant in their frequency in the histogram, there is at least one spatial direction which exhibits a thereto comparatively significantly lower frequency. Of course, this process can comparatively be adapted by the person of ordinary skill in the art for an optimization degree with diverse directional selectivity in the reception characteristic.

A further advantageous improvement of the inventive speech recognition system has the objective that in the case that a conclusion is made that multiple speakers are present, the speech recognition system connects to at least one further speech recognizer. The connecting occurs in ideal manner directly behind the optimization unit (10), so that to a certain extent a parallel arrangement of the speech recognizers results. In this manner the processing power can be further increased and optimized, in particular when each of the individual speech recognizers is supplied specifically with the respective speech signal which originates from the respective spatial direction correlated with one individual of the multiple speakers.

The invention claimed is:

1. A process for regulating a speech recognition system, in which reception characteristics of each microphone in a microphone array are controlled by an optimization unit (10),
   wherein speech signals are received and processed via the microphone array, and
   in which in the course of the processing of the speech signals, the reception characteristics of each microphone in the microphone array (12) are so controlled by the optimization unit (10), that the recognition power of a speech recognizer (11) downstream of the optimization unit (10) is optimized,
   wherein the speech signals received by the speech recognizer (11) are supplied by multiple parallel or quasi-parallel speech channels (14),
   wherein the speech recognizer (11) processes these speech channels parallel, at least in time, and compares the quality of the recognition results, produced by the speech recognizer, with each other,
   and wherein on the basis of this comparison:
   on the one hand, the speech signals from the speech channels (14) which have the potential for a best possible recognition are selected and further processed,
   and on the other hand, the optimization unit (10) obtains from the speech recognizer the necessary regulating signals (18), in order to optimize the reception characteristics of the microphone array (12) in regard to the respective speech channels (14) via which the respective speech signal is received which has the potential for the best possible recognition.

2. The process according to claim 1, wherein the speech recognition in the speech recognizer (11) occurs in a framework of a multistage process, which includes at least the following sequential processing steps:
   classification (15), for recognition of sound units and/or subunits of sound units,
   word recognition (16), for recognizing spoken words, and
   interpretation, for recognition and interpretation of meaningful sentences (17), and wherein by one or more of these processing steps:
   on the one hand, a selection of speech signals is made, which have the potential for the best possible recognition, and which are to be supplied to a further processing,
   and on the other hand, the regulating signals (18) necessary for the optimization unit (10) are provided in order to optimize the reception characteristics of the microphone array (12) in regard to the respective speech channel (14) from which the respective speech signal is received, which has the potential for the best possible recognition.

3. The process according to claim 1, wherein
   a statistical analysis is made regarding which reception characteristics achieve optimal recognition in the microphone array,
   and wherein beginning with the statistical result it is determined whether speech signals processed by the speech recognition system originate from different speakers.

4. The process according to claim 3, wherein the statistical analysis is carried out in the manner of a histogram, which lists various spatial adjacent-lying spatial orientations along its ordinate and displays how frequently a signal received from one of these specific spatial orientations contributes to a usable recognizable result,
   wherein a determination of different speakers is made if, in between two spatial directions pronounced in their frequency in the histogram, there is located at least one spatial direction which exhibits a comparatively significantly low frequency.

5. The process according to claim 1, wherein in the case that the presence of multiple speakers (30, 31) is determined, the speech recognition system is connected to at least one additional speech recognizer,
   which exhibits essentially the same functionality as the speech recognizer already contained in the speech recognition system,
   and which is supplied by the optimization device (10) with those respective speech signals which originate from the spatial direction which is associated with at least one of the multiple speakers.

6. A device for regulating a speech recognition system, comprised of a microphone array with an optimization unit (10) for modification of the received characteristics of each microphone in the microphone array (12),
   which has at least one speech recognizer (11), to which the speech signals are supplied and which processes these,
   wherein the speech recognizer (11) is in communication with the optimization device (10) for modification of the reception characteristics of each microphone in the microphone array (12), so that via this communication the received characteristics can be regulated in the manner that the recognition performance of the speech recognizer (11) downstream of the optimization unit (10) is optimized,
   wherein the speech recognizer (11) is in communication with the optimization device (10) in such a manner that the speech signals are supplied to the speech recognizer (11) via parallel or quasi-parallel speech channels (14), and wherein the speech recognizer (11) is so designed, that it processes these different speech signals parallel or quasi-parallel and can compare recognition results, produced by the speech recognizer, with each other with regard to their quality, and that on the basis of this comparison:

on the one hand the speech signals of the respective speech channels are selected and further processed, which have the potential for the best possible recognition, and on the other hand the optimization unit (10) obtains from the speech recognizer the necessary regulating signals (18), in order to optimize the reception characteristics of the microphone array in regard to the respective speech channels (14), which relay the speech signals which have the potential for the best possible recognition.

7. The device according to claim 6, wherein the speech recognizer is multistage and includes at least:

a classifier (15), for recognizing sounds and/or sound subunits of sounds, a unit for recognizing spoken words in the received speech signals (16), and a unit for interpretation of the received speech signals (17), for recognizing and interpreting meaningful sentences, and wherein via one or more of these processing stages:

on the one hand, a selection of speech signals is made, which have the potential for the best possible recognition, and which are to be supplied to a further processing, and on the other hand, the regulating signals (18) necessary for the optimization unit (10) are provided in order to optimize the reception characteristic of the microphone array (12) in regard to the respective speech channels (14), which relay the respective speech signals, which have the potential for the best possible recognition.

8. The device according to claim 6, wherein the device is so designed, that in the case that the received speech signal is associated with multiple speakers, at least one additional speech recognizer can be connected, which has essentially the same functionality of the speech recognizer (11) already contained in the speech recognition system, and which is in communication with the optimization unit (10) in such a manner that those respective speech signals are supplied to it, which originate from the spatial direction, which is associated with at least one of the multiple speakers.

* * * * *